US012608874B2

(12) United States Patent
Aschenbeck et al.

(10) Patent No.: US 12,608,874 B2
(45) Date of Patent: Apr. 21, 2026

(54) NEURAL RADIANCE FIELD RAY CONSTRUCTION FOR TRUE NADIR RENDERINGS

(71) Applicant: VANTOR INC., Westminster, CO (US)

(72) Inventors: Michael G. Aschenbeck, Wayzata, MN (US); James M. Balasalle, Erie, CO (US); Timothy J. Colgan, Madison, WI (US); Bryan T. Doyle, Thornton, CO (US)

(73) Assignee: VANTOR INC., Westminster, CO (US)

( * ) Notice: Subject to any disclaimer, the term of this patent is extended or adjusted under 35 U.S.C. 154(b) by 150 days.

(21) Appl. No.: 18/512,208

(22) Filed: Nov. 17, 2023

(65) Prior Publication Data

US 2025/0166278 A1 May 22, 2025

(51) Int. Cl.
| | |
|---|---|
| *G06T 15/06* | (2011.01) |
| *G06T 15/08* | (2011.01) |
| *G06T 15/20* | (2011.01) |

(52) U.S. Cl.
CPC .............. *G06T 15/06* (2013.01); *G06T 15/08* (2013.01); *G06T 15/20* (2013.01)

(58) Field of Classification Search
None
See application file for complete search history.

(56) References Cited

U.S. PATENT DOCUMENTS

| | | | | |
|---|---|---|---|---|
| 2024/0212252 A1* | 6/2024 | Wu | ...................... | G06V 20/46 |
| 2024/0273811 A1* | 8/2024 | Radwan | .............. | G06T 15/205 |
| 2024/0307783 A1* | 9/2024 | Menapace | .............. | A63F 13/67 |
| 2025/0166288 A1* | 5/2025 | Perel | ...................... | G06T 15/20 |

OTHER PUBLICATIONS

Mari, Roger et al. "Sat-NeRF: Learning Multi-View Satellite Photogrammetry With Transient Objects and Shadow Modeling Using RPC Cameras" @inproceedings {mari2022sat} [2022 IEEE/CVF Conference on Computer Vision and Pattern Recognition Workshopts (CVPRW)] 2022; https://github.com/centreborelli/satnerf; (5 pgs).

Dawa, Derksen et al. "Shadow Neural Radiance Fields for Multi-View Photogrammetry"; CVPR 2021 Workshop on Earth Vision; https://github.com/esa/snerf; (4 pgs).

Deng, Kangle et al. "Depth-supervised NeRF: Fewer Views and Faster Training for Free" CVPR 2022 Bibtex; https://www.cs.cmu.edu/~dsnerf/ (11 pgs).

Bruella, Ricardo Martin et al.; "NeRF in the Wild: Neural Radiance Fields for Unconstrained Photo Collections" CVPR 2021 (Oral) 2. NeRF in the Wild: https://nerf-w.github.io/ (3 pgs).

(Continued)

*Primary Examiner* — Nurun Flora
(74) *Attorney, Agent, or Firm* — Harness, Dickey & Pierce, P.L.C.

(57) ABSTRACT

Extraction of depth from satellite images using neural radiance fields may be provided. Satellite image data may be received. Then a plurality of nadir rays, each with a plurality of points, in a first space may be constructed. A Machine Learning (ML) model may then be used to map the plurality of points along the plurality of nadir rays in the first space to a second space. Then the plurality of points along the plurality of nadir rays in the second space may be rendered into images and depths.

20 Claims, 5 Drawing Sheets

(56) References Cited

OTHER PUBLICATIONS

Mildenhall, Ben et al.; "NeRF: Representing Scenes as Neural Radiance Fields for View Syntheis" ECCV 2020 Oral; @inproceedings{mildenhall2020nerf}; https://www.matthewtancik.com/nerf; (10 pgs).

Zhang et al: "SparseSat-NeRF: Dense Depth Supervised Neural Radiance Fields for Sparse Satellite Images", arxiv.org, Cornell University Library, Sep. 1, 2023, XP091603152; 10 pgs.

Purushottam: "NeRF Studio Made Easy-From Computer Vision Scientists' rooms to Software Engineers' desks", Feb. 26, 2023, XP093256973—Retrieved from the Internet: URL:https://www.linkedin.com/pulse/nerf-studio-made-easy-from-computer-vision-rooms-desks-chaudhary; 11 pgs.

Lin et al: "MIRA: Mental Imagery for Robotic Affordances", arxiv.org, Cornell University Library, Dec. 12, 2022, XP091392367; 14 pgs.

* cited by examiner

NEURAL RADIANCE FIELD RAY CONSTRUCTION FOR TRUE NADIR RENDERINGS

TECHNICAL FIELD

The present disclosure relates generally to providing extraction of depth and color models from satellite images using neural radiance fields.

BACKGROUND

Satellite images are images of Earth collected by imaging satellites operated by governments and businesses around the world. Satellite imaging companies sell images by licensing them to governments and businesses. Satellite images have many applications in meteorology, oceanography, fishing, agriculture, biodiversity conservation, forestry, landscape, geology, cartography, regional planning, and education. Images may be in visible colors and in other spectra. There are also elevation maps, usually made by radar images. Image interpretation and analysis of satellite imagery may be conducted using software.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
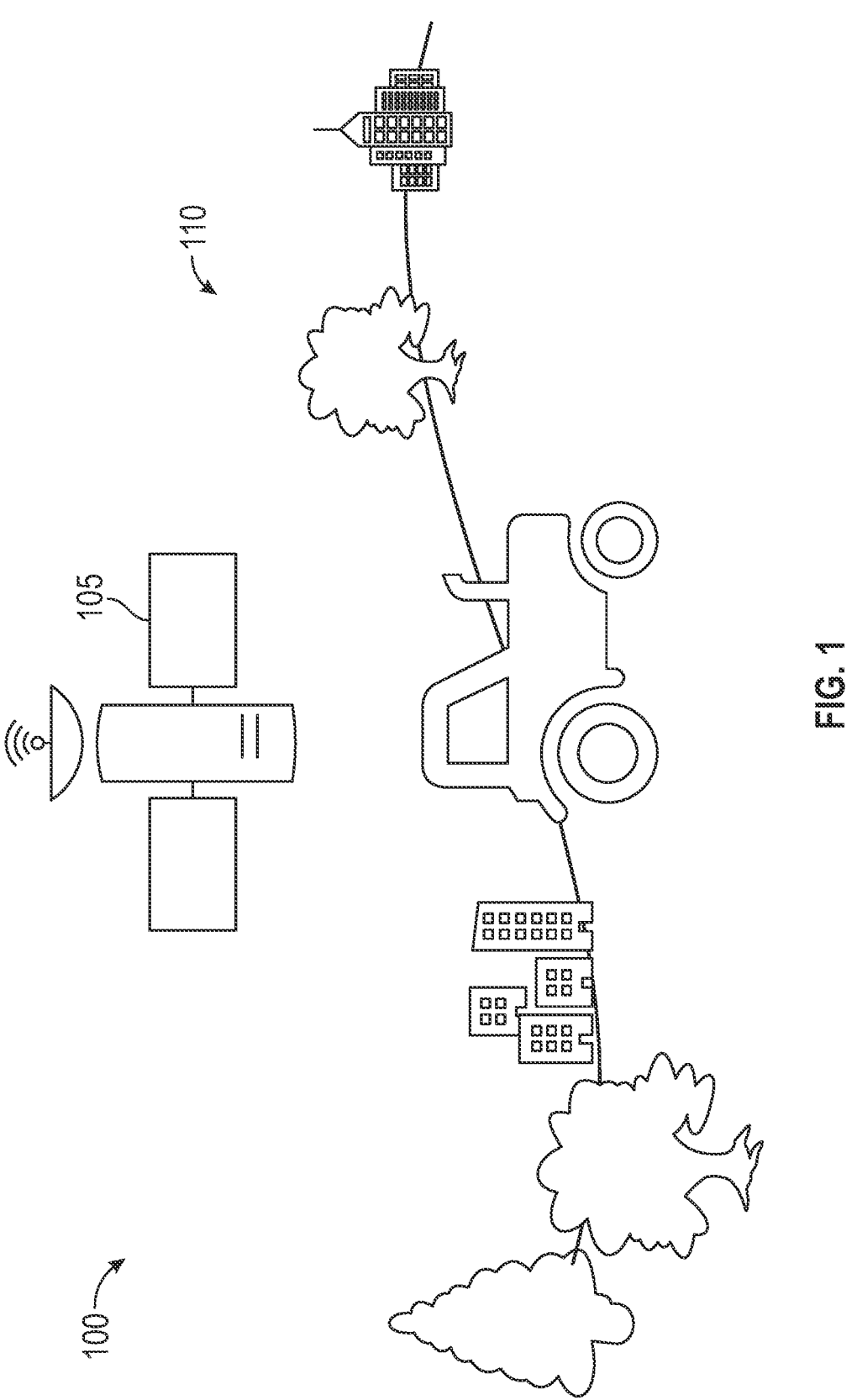
FIG. 1 is a diagram of an operating environment for providing extraction of depth from satellite images using neural radiance fields.

Extraction of depth from satellite images using neural radiance fields may be provided. Satellite image data may be received. Then a plurality of nadir rays, each with a plurality of points, in a first space may be constructed. A Machine Learning (ML) model may then be used to map the plurality of points along the plurality of nadir rays in the first space to a second space. Then the plurality of points along the plurality of nadir rays in the second space may be rendered into images and depths.

Both the foregoing overview and the following example embodiments are examples and explanatory only, and should not be considered to restrict the disclosure's scope, as described and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Conventional three dimensional (3D) reconstruction processes may rely on classic photogrammetric techniques and may be subject to problems and artifacts caused by uniform colors (e.g., water pixels), poor collection geometry, transient objects, and limited imagery for example. Neural Radiance Fields may comprise a machine-learning based processes that may mitigate some drawbacks to traditional photogrammetry processes.

FIG. 1 shows an operating environment 100 for providing extraction of depth from satellite images using neural radiance fields. As shown in FIG. 1, operating environment 100 may comprise a satellite 105 and a scene 110. Satellite 105 may comprise a commercial Earth observation and imaging satellite used or designed for Earth Observation (EO) from orbit, including environmental monitoring, meteorology, cartography, and others. Satellite 105 may collect images in panchromatic and multispectral bands for example. The orbiting altitude of satellite 105 may comprise, but is not limited to, 617 km. Satellite 105 may be used to take images of scene 110 that may be on the surface of the Earth. Satellite image data associated with scenes consistent with embodiments of the disclosure may be obtained by satellite 105 or by other processes or satellites.

Figure 2:
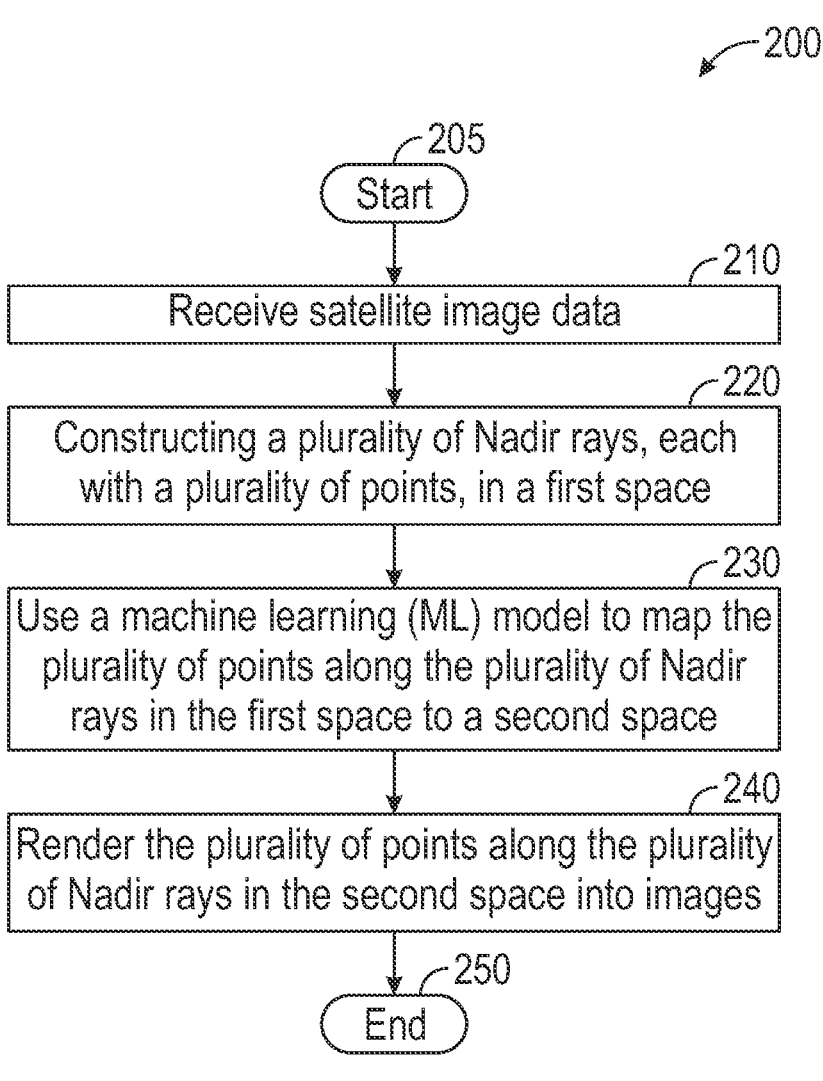
FIG. 2 is a flow chart of a method for providing extraction of depth from satellite images using neural radiance fields.

FIG. 2 is a flow chart setting forth the general stages involved in a method 200 consistent with embodiments of the disclosure for providing extraction of depth from satellite images using neural radiance fields. Method 200 may be implemented using a computing device 500 as described in more detail below with respect to FIG. 5. Ways to implement the stages of method 200 will be described in greater detail below.

Method 200 may begin at starting block 205 and proceed to stage 210 where computing device 100 may receive satellite image data. For example, satellite image data of a scene may be obtained by satellite 105 and provided to computing device 100.

Figures 3A, 3B, 3C, 3D:
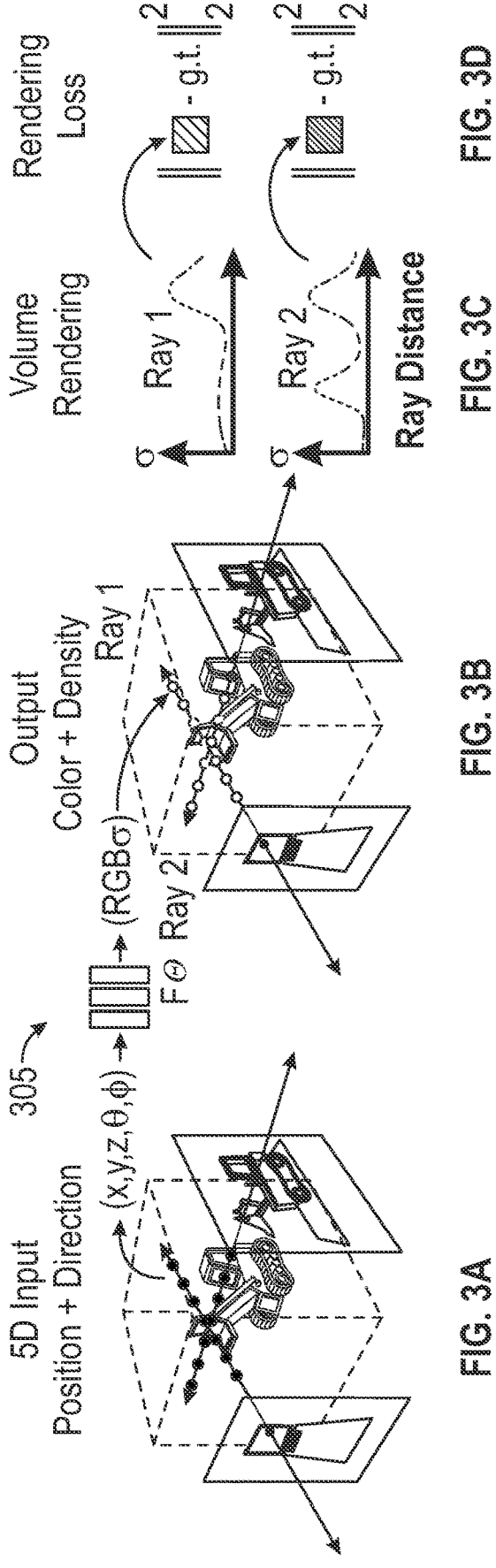
FIG. 3A, FIG. 3B, FIG. 3C, and FIG. 3D illustrate providing extraction of depth from satellite images using neural radiance fields.

From stage 210, where computing device 100 receives the satellite image data, method 200 may advance to stage 220 where computing device 100 may construct a plurality of nadir rays, each with a plurality of points, in a first space. For example, FIG. 3A illustrates the plurality of points along the plurality of rays in the first space. In this visualization, a continuous scene may be represented as a 3D or 5D vector-valued function whose input includes a 3D location $x=(x, y, z)$ and, in this example, a 2D viewing direction $(\theta, \varphi)$. Images may be synthesize by sampling 3D or 5D coordinates (location and, possibly, a viewing direction) along camera rays. The 2D viewing direction when you assume the surface is Lambertian, as is commonly assumed for satellite imagery.

Once computing device 100 constructs the plurality of nadir rays, each with the plurality of points, in the first space in stage 220, method 200 may continue to stage 230 where computing device 100 may use a Machine Learning (ML) model 305 to map the plurality of points along the plurality of rays in the first space to a second space. For example, as illustrated by FIG. 3B, the data in the first space may be fed into a Multilayer Perceptron (MLP) network to produce a color and volume density in the second space (e.g., the output in the second space may comprise an emitted color $c=(r, g, b)$ and volume density $\sigma$).

With the 2D viewing direction omitted, the continuous 3D scene representation may be approximated with an MLP network $F_\Theta$: $(x) \rightarrow (c, \sigma)$ with optimized weights $\Theta$ to map from each input 3D coordinate to its corresponding volume density and directional emitted color. Assuming a Lambertian surface, the representation may be Multiview consistent.

Conventional neural radiance fields systems may use a pinhole camera model or a push broom model/Rational Polynomial Camera (RPC) model. The RPC camera model may not be suitable to create some views, for example, for a Digital Surface Model (DSM) or true ortho. DSM may comprise an elevation model that may capture both the environment's natural and artificial features. It may include the tops of buildings, trees, powerlines, and any other objects. A true ortho may comprise an image that removes perspective distortion.

Figure 4:
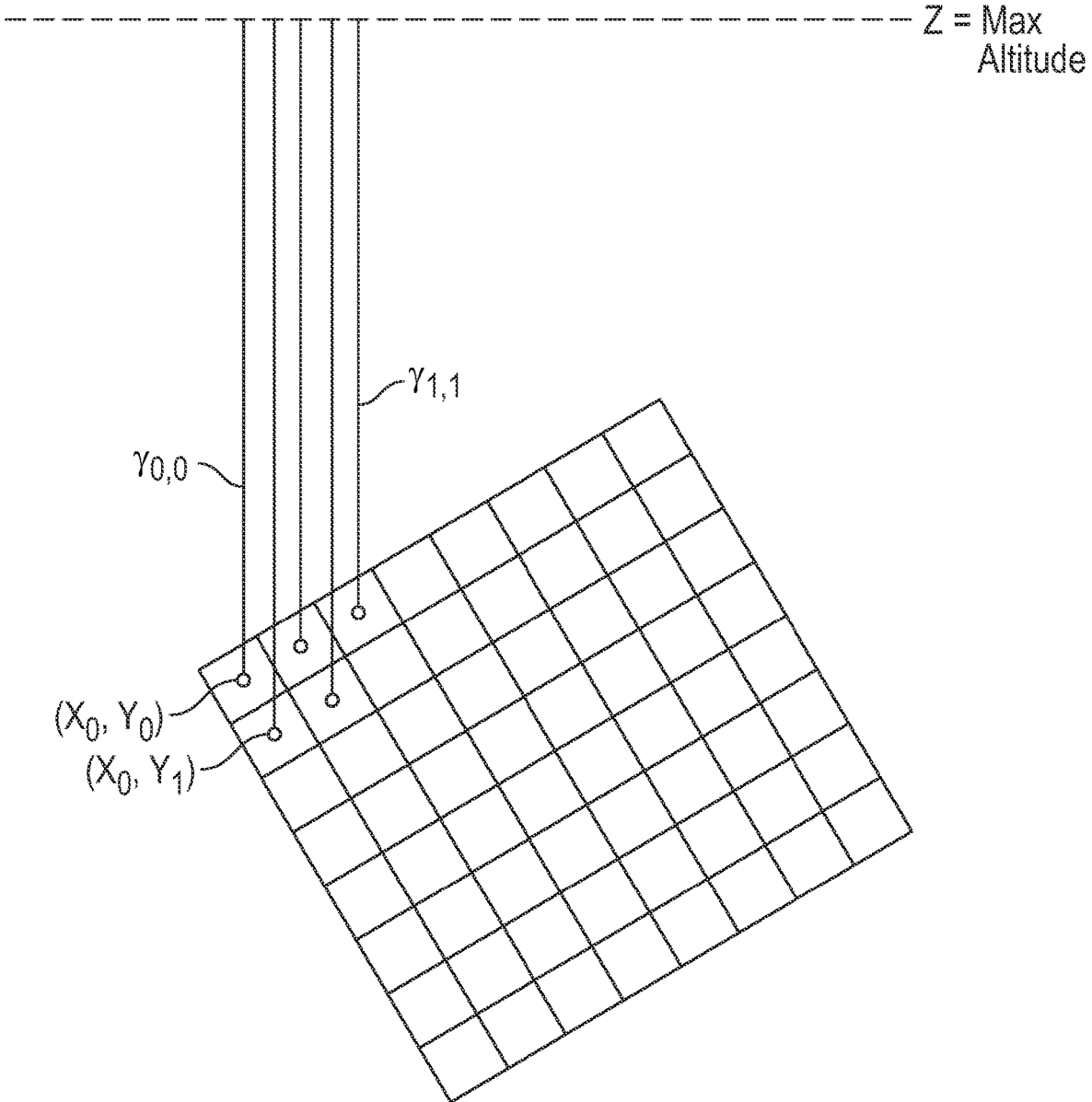
FIG. 4 illustrates a nadir camera model.

FIG. 4 illustrates a nadir camera model that may be used to produce nadir rays. Nadir may comprise a direction pointing directly below a particular location, for example, it may be one of two vertical directions at a specified location, orthogonal to a horizontal flat surface.

As stated above, a DSM may comprise a 3D representation of the earth's natural and man-made features. DSMs may be important for a variety of remote sensing tasks, including producing accurate orthorectified images. Embodiments of the disclosure may provide a process to use a trained neural radiance field model to produce a DSM with any resolution and projection.

With the nadir camera model of FIG. 4, a floating grid may be created in projected space such as Universal Transverse Mercator (UTM) coordinates for example. The grid in FIG. 4 may be in the XY plane and may comprise a plurality of cells. For each UTM point, $(x\_i, y\_j)$ in the center of each grid cell, a nadir ray, $r\_ij$ may be drawn in the vertical/z direction. Each nadir ray may have an origin point of $(x\_i, y\_i, max\_altitude)$ and directional vector of $(0,0,-1)$ with "max_altitude" being set at or above the elevation of the highest feature in an Area of Interest (AOI). The nadir rays may be sampled, sent through the ML model, and rendered to get a surface depth $(\sigma)$. This may provide a DSM of surface depth at a given x,y grid point. With respect to true ortho, the nadir rays may be sent through the ML model in a similar way to get a color (c).

After computing device 100 uses the ML model to map the plurality of points along the plurality of rays in the first space to the second space in stage 230, method 200 may proceed to stage 240 where computing device 100 may render the plurality of points along the plurality of rays in the second space into images. For example, volume rendering techniques may be used to composite these values into an image as illustrated by FIG. 3C. This rendering function may be differentiable, so the scene representation may be optimized by minimizing the residual between synthesized and ground truth observed images as illustrated by FIG. 3D. Once computing device 100 renders the plurality of points along the plurality of rays in the second space into images in stage 240, method 200 may then end at stage 250.

Figure 5:
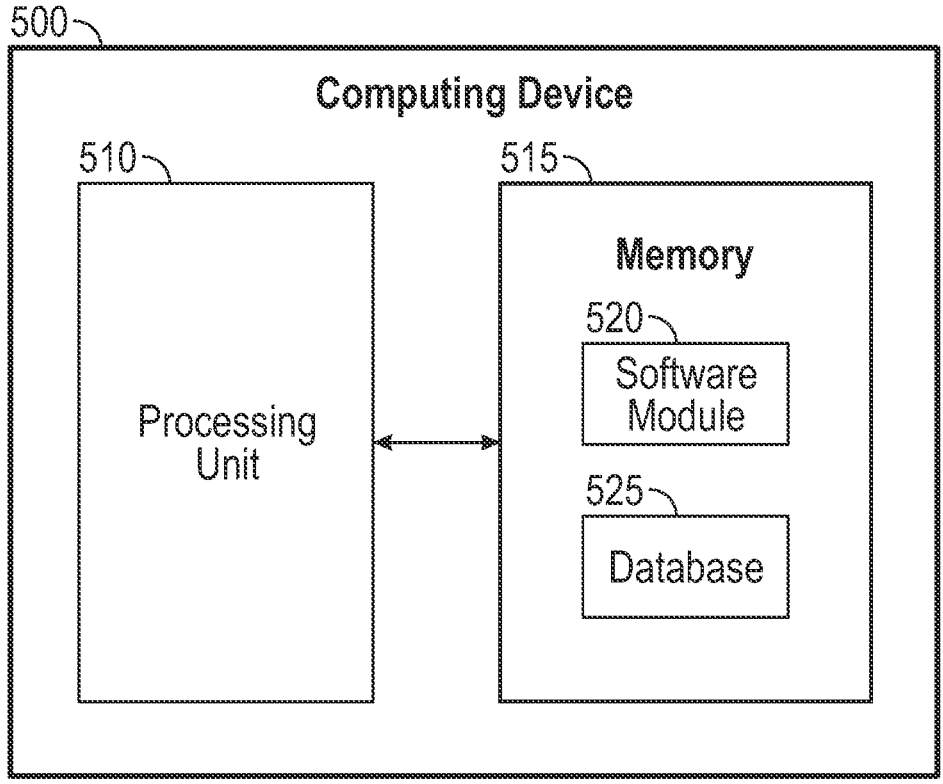
FIG. 5 is a block diagram of a computing device.

FIG. 5 shows computing device 500. As shown in FIG. 5, computing device 500 may include a processing unit 510 and a memory unit 515. Memory unit 515 may include a software module 520 and a database 525. While executing on processing unit 510, software module 520 may perform, for example, processes for providing extraction of depth from satellite images using neural radiance fields as described above with respect to FIG. 2. Computing device 500, for example, may be deployed in in satellite 105. Notwithstanding, computing device 500 may be deployed anywhere and the image data may be transmitted from satellite 105 to a network, for example, and then sent to computing device 500.

Computing device 500 may be implemented using a tablet device, a mobile device, a smart phone, a telephone, a remote control device, a personal computer, a network computer, a mainframe, a router, a switch, a server cluster, a smart TV-like device, a network storage device, a network relay devices, or other similar microcomputer-based device. Computing device 500 may comprise any computer operating environment, such as hand-held devices, multiprocessor systems, microprocessor-based or programmable sender electronic devices, minicomputers, mainframe computers, and the like. Computing device 500 may also be practiced in distributed computing environments where tasks are performed by remote processing devices. The aforementioned systems and devices are examples and computing device 500 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random-access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general-purpose computer or in any other circuits or systems.

Embodiments of the disclosure may be practiced via a system-on-a-chip (SOC) where each or many of the elements illustrated in FIG. 5 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 500 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
receiving satellite image data;
constructing a plurality of nadir rays, each of the nadir rays extending from a unique point of origin to a pixel from the image data, whereby the plurality of nadir rays are parallel to one another, each of the plurality of nadir rays further including a plurality of points, in a first space;
using a Machine Learning (ML) model to map the plurality of points along the plurality of nadir rays in the first space to a second space; and
rendering the plurality of points along the plurality of nadir rays in the second space into images.

2. The method of claim 1, wherein the ML model comprises a Multilayer Perceptron (MLP) network.

3. The method of claim 1, wherein the first space is associated with at least one of a spatial location and a viewing direction.

4. The method of claim 3, wherein the spatial location comprises a three dimensional Cartesian location.

5. The method of claim 3, wherein the viewing direction comprises a two dimensional viewing direction.

6. The method of claim 1, wherein the second space is associated with a volume density and a directional emitted color.

7. The method of claim 1, wherein the directional emitted color comprises a Red Green Blue (RGB) color.

8. A system comprising:
a memory storage; and
a processing unit coupled to the memory storage, wherein the processing unit is operative to:
receive satellite image data;
construct a plurality of nadir rays, each of the nadir rays extending from a unique point of origin to a pixel from the image data, whereby the plurality of nadir rays are parallel to one another, each of the plurality of nadir rays further including a plurality of points, in a first space;
use a Machine Learning (ML) model to map the plurality of points along the plurality of nadir rays in the first space to a second space; and
render the plurality of points along the plurality of nadir rays in the second space into images.

9. The system of claim 8, wherein the ML model comprises a Multilayer Perceptron (MLP) network.

10. The system of claim 8, wherein the first space is associated with at least one of a spatial location and a viewing direction.

11. The system of claim 10, wherein the spatial location comprises a three dimensional Cartesian location.

12. The system of claim 10, wherein the viewing direction comprises a two dimensional viewing direction.

13. The system of claim 8, wherein the second space is associated with a volume density and a directional emitted color.

14. The system of claim 8, wherein the directional emitted color comprises a Red Green Blue (RGB) color.

15. A non-transitory computer-readable medium that stores a set of instructions which when executed perform a method executed by the set of instructions comprising:
receiving satellite image data;
constructing a plurality of nadir rays, each of the nadir rays extending from a unique point of origin to a pixel from the image data, whereby the plurality of nadir rays are parallel to one another, each of the plurality of nadir rays further including a plurality of points, in a first space;
using a Machine Learning (ML) model to map the plurality of points along the plurality of nadir rays in the first space to a second space; and
rendering the plurality of points along the plurality of nadir rays in the second space into images.

16. The non-transitory computer-readable medium of claim 15, wherein the ML model comprises a Multilayer Perceptron (MLP) network.

17. The non-transitory computer-readable medium of claim 15, wherein the first space is associated with at least one of a spatial location and a viewing direction.

18. The non-transitory computer-readable medium of claim 17, wherein the spatial location comprises a three dimensional Cartesian location.

19. The non-transitory computer-readable medium of claim 17, wherein the viewing direction comprises a two dimensional viewing direction.

20. The non-transitory computer-readable medium of claim 15, wherein the second space is associated with a volume density and a directional emitted color.

* * * * *